United States Patent
Honda et al.

(10) Patent No.: US 7,771,764 B2
(45) Date of Patent: *Aug. 10, 2010

(54) METHOD FOR PRODUCING AN EXTRACT OF COFFEE BEANS

(75) Inventors: Takeshi Honda, Koto-ku (JP); Takeshi Imazawa, Odawara (JP); Takamune Tanaka, Odawara (JP); Takao Tomita, Odawara (JP); Yasushi Kubota, Odawara (JP); Naoki Orii, Odawara (JP); Tadashi Nakatsubo, Odawara (JP)

(73) Assignee: Meiji Dairies Corporation, Tokyo (JP)

( * ) Notice: Subject to any disclaimer, the term of this patent is extended or adjusted under 35 U.S.C. 154(b) by 1080 days.

This patent is subject to a terminal disclaimer.

(21) Appl. No.: 10/543,891

(22) PCT Filed: Jan. 30, 2004

(86) PCT No.: PCT/JP2004/000913

§ 371 (c)(1),
(2), (4) Date: Jun. 26, 2006

(87) PCT Pub. No.: WO2004/066745

PCT Pub. Date: Aug. 12, 2004

(65) Prior Publication Data

US 2006/0257547 A1    Nov. 16, 2006

(30) Foreign Application Priority Data

Jan. 30, 2003    (JP) .............................. 2003-021879

(51) Int. Cl.
*A23F 5/00*    (2006.01)
(52) U.S. Cl. .................. 426/433; 426/594; 426/432; 426/655; 426/597; 426/431; 426/435
(58) Field of Classification Search ................. 426/655, 426/597, 431, 435, 433, 594, 432
See application file for complete search history.

(56) References Cited

U.S. PATENT DOCUMENTS

| 2,253,696 | A | 8/1941 | Fauth |
| 3,630,754 | A | 12/1971 | Truman |
| 5,182,406 | A | 1/1993 | Coenen |
| 5,902,622 | A | 5/1999 | Owusu-Ansah et al. |

(Continued)

FOREIGN PATENT DOCUMENTS

CN    1095242 A    11/1994

(Continued)

OTHER PUBLICATIONS

Supplementary European Search Report dated Jan. 11, 2006.

(Continued)

*Primary Examiner*—Anthony Weier
(74) *Attorney, Agent, or Firm*—Sughrue Mion, PLLC

(57) ABSTRACT

A method for producing an extract and/or a squeezed liquid, which includes: feeding a food to be extracted and/or squeezed into a crushing apparatus; adding a solvent into the crushing apparatus immediately after and/or while milling the food; extracting and/or squeezing a useful food component of the food into the solvent; and carrying out liquid-solid separation by removing the resulting extracted residue and/or squeezed residue with a continuous solid-liquid separation apparatus.

7 Claims, 1 Drawing Sheet

U.S. PATENT DOCUMENTS 6,491,892 B1    12/2002    Bartels et al.

FOREIGN PATENT DOCUMENTS

| CN | 2478590 A | 2/2002 |
| --- | --- | --- |
| CN | 1341444 A | 3/2002 |
| CN | 1348721 A | 5/2002 |
| DE | 3907427 * | 9/1990 |
| EP | 343678 A | 11/1989 |
| GB | 2018560 A | 10/1979 |
| JP | 62-126935 A | 6/1987 |
| JP | 7-163294 A | 6/1995 |
| JP | 8-56577 A | 3/1996 |
| JP | 11-144 A | 1/1999 |
| JP | 11-75694 A | 3/1999 |
| WO | WO 95/03380 A1 | 2/1995 |
| WO | WO 97/16073 A1 | 5/1997 |
| WO | WO 03/45159 A1 | 6/2003 |

OTHER PUBLICATIONS

Chinese Office Action dated Apr. 10, 2009.
International Search Report dated Apr. 16, 2004.
R.J. Clarke, et al; "Coffee"; Elsevier Applied Science; London and New York; 1987; vol. 2: Technology.
Richard Cepeda, et al; "Tecnologia De Cereales Y Oleaginosas"; Sandtefe de Bogada D.C.; 1991.
European Office Action dated Aug. 12, 2008.
Chinese Office Action dated Dec. 29, 2006.

* cited by examiner

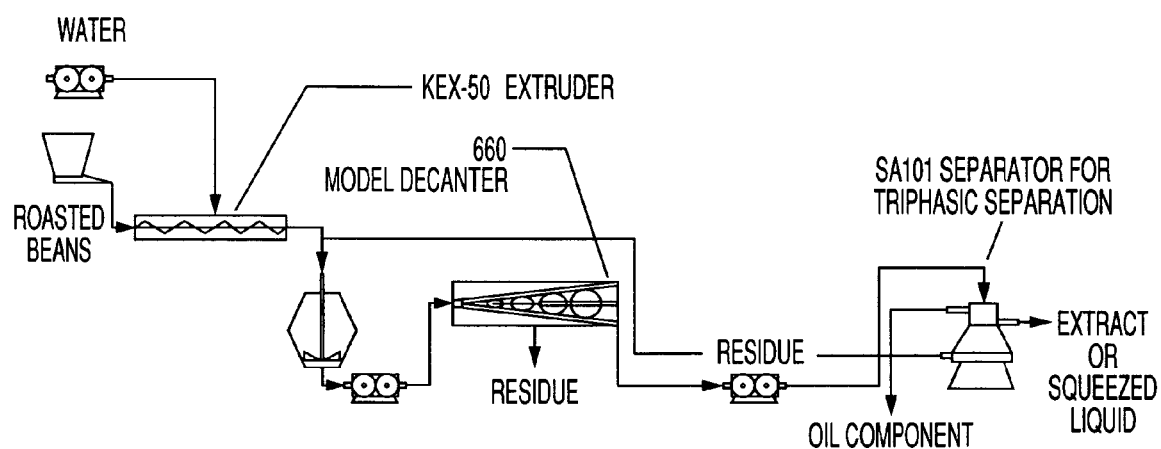
FIGURE

METHOD FOR PRODUCING AN EXTRACT OF COFFEE BEANS

TECHNICAL FIELD

The present invention provides a method for economically producing an extract and/or a squeezed liquid which is free from deterioration in flavor with good workability in which a solid-liquid suspension obtained by extracting and/or squeezing a food to be extracted and/or squeezed immediately after and/or while milling the food is subjected to solid-liquid separation continuously, quickly and efficiently.

BACKGROUND ART

In the method of producing an extract and/or a squeezed liquid from a food to be extracted and/or squeezed, as a representative example for industrial production of a regular coffee extract, a method of extracting a prescribed amount of a crushed material of roasted coffee beans with hot water using a closed extract column, a kneader, or the like is commonly employed. After roasting, coffee beans are crushed by a grinder or the like. In the paper filter drip method for household use, the coffee beans are milled into an extent of approximately 400 μm. Whereas, in the case of dripping industrially using a kneader and an extract column, since a fine powder causes clogging, in many cases, removal of the fine powder is carried out in advance using a sifter or the like to unify the particle size at the time of crushing to approximately 3 to 5 mm. Thereafter, the crushed beans are held in hot water at about 90° C. for several minutes and then subjected to solid-liquid separation by means of spontaneous drop using a flannel, a mesh filter, or the like.

However, according to the above-mentioned method, oxidation quickly occurs since the extract operation must be repeated for every batch and due to high temperatures, which results in deterioration in flavor and loss of aroma fragrant components. Furthermore, when the scale becomes large, it takes a long time to completely drain the liquid. In general, the residue is transferred in a disposal step after several minutes. However, the residue does not reach the state where the liquid is sufficiently drained but contains water of five times or more that of the time of drying. Thus, in order to sufficiently recover the coffee extract, warm water or the like is sprinkled in some cases. For achieving this operation, it takes several tens of minutes, and liquid draining of the ultimate residue after solid-liquid separation is still insufficient. Accordingly, in all cases, problems such as putrefaction in the disposal works and a burden in transport costs remain.

In the light of the above, according to this method, it is impossible to continuously obtain useful components with good flavor within a short period of time by keeping high extraction efficiency and squeezing efficiency at low temperatures in the treatment technologies of extraction and/or squeezing and solid-liquid separation. Also, the residue following the solid-liquid separation is not sufficiently dehydrated. Accordingly, this method is far from a method which reduce the labor and costs of disposal, and it cannot be said that this method is desirable for the production process from the viewpoints of product quality, improvement in works, and preservation of the environment.

The present applicant already reported a method for producing an extract and/or a squeezed liquid, which comprises feeding a food to be extracted and/or squeezed into a crushing apparatus having a narrow gap, adding a low-temperature solvent of lower than 60° C. thereto immediately after crushing and/or simultaneously with crushing and treating the food within the apparatus to extract and/or squeeze a useful food component into the solvent, followed by removing the resulting extracted residue and/or squeezed residue, if necessary (see JP-A-2003-225054).

According to the publication, it is possible to continuously obtain a solid-liquid suspension comprising a useful component with good flavor in a short time by keeping high extraction efficiency and squeezing efficiency at low temperatures in the processing technologies of extraction and/or squeezing. However, with respect to the solid-liquid separation method of a solid-liquid suspension, specifically, it is merely described in the working examples that centrifugation is carried out at 750 G for 10 minutes, but the degree of dehydration of the residue after solid-liquid separation is unclear. The publication does not mention at all whether the production method is desirable from the viewpoint of preservation by which the labor and costs of disposal of the residue can be reduced.

Also, there is reported a method for extracting an effective component of coffee by feeding roasted coffee beans into a twin-screw extruder and pressing the coffee beans with added hot water to separate the extracted liquid containing water-soluble components in the coffee beans from a residue (see JP-A-62-126935).

The invention of this publication relates to a method for extracting coffee in which a concentrated liquid which is little dissipation of flavor components is rationally obtained. Since the amount of hot water to be added is kept to a minimum necessary for the extraction, the recovered concentrated liquid is strong so that it can be directly used as the raw material for instant coffee. The concentrated liquid is obtained by extracting the water-soluble components in the coffee beans into the hot water by the heat and pressure of the extruder and squeezing out of the extruder through a gap in a slit barrel, provided at a proper position, by forward compression force. The residue of coffee beans from which the water-soluble components have been extracted is directly pushed out from a discharge port in the forward end of the extruder.

Accordingly, since this method is concerned with the extraction using a minimum amount of high-temperature hot water under high pressure in an extruder, it has an advantage that the extracted residue is dehydrated to some extent. However, this method does not avoid deterioration in flavor by rapid oxidation of the coffee beans caused by high temperature.

According to the above-mentioned conventional methods, it is extremely difficult to efficiently and continuously extract and/or squeeze soluble solid components from a food to be extracted and/or squeezed particularly with a solvent in a low temperature region quickly after crushing. Accordingly, milling is needed, and the subsequent work such as solid-liquid separation cannot be carried out quickly and continuously by the conventional methods on an industrial scale.

Furthermore, the method for producing a coffee extract which contains high fat was reported (see JP-A-11-075694). The publication discloses a method for the production of a coffee extract which contains high fat by simultaneous crushing and extraction of coffee beans, which comprises mixing roasted and crudely crushed coffee beans with water and passing the mixed water through a wet medium grinder to further mill the coffee beans.

A coffee extract which contains high fat and is rich in flavor can be obtained by using a wet medium grinder comprising a specific constitution. However, since coffee beans are crudely crushed before milling, coffee flavor dissipates and the resulting coffee extract liquid contains less flavor.

DISCLOSURE OF THE INVENTION

In order to solve the above-mentioned problems of the conventional technologies, an object of the invention is to provide a production method which enables carrying out continuous mass production extremely efficiently even at room temperature, which is extremely useful for prevention of deterioration in flavor caused by oxidation or the like of a food to be extracted and/or squeezed and for economic efficiency and for a workable treatment method as well as for an environmentally friendly method which enables easy disposal of the residue after solid-liquid separation, in comparison with the conventionally employed extracting and/or squeezing plus solid-liquid separation methods, including the low-temperature extract method which requires a long time, high-temperatures, and batch solid-liquid separation.

In order to achieve the above-mentioned object, the present invention has been made. The inventors of the present invention made investigations from every perspective. As a result, it has been found that it is possible to quickly and continuously carry out extraction and/or squeezing and solid-liquid separation, to obtain an extract and/or a squeezed liquid free from deterioration in flavor, and also to obtain a sufficiently dehydrated extracted residue and/or squeezed residue by feeding a food to be extracted and/or squeezed into a crushing apparatus having narrow gaps, adding a solvent into the apparatus immediately after and/or while milling the food, extracting and/or squeezing a useful food component of the food into the solvent, and carrying out continuous solid-liquid separation by removing the resulting extracted residue and/or squeezed residue with a continuous solid-liquid separation apparatus. Further, extraction and/or squeezing and solid-liquid separation are continuously carried out so that oxidation leading to deterioration in flavor can be suppressed as far as possible, and therefore, an extract and/or a squeezed liquid with less deterioration in flavor can be obtained.

Also, it is possible to obtain an extract and/or a squeezed liquid with good flavor, having a reduced amount of the extracted residue and/or squeezed residue and being free from deterioration in flavor, by removing gustatory inhibiting substances such as oil components contained in the extracted liquid and/or squeezed extract obtained by the above-mentioned process by a centrifuge and, if necessary, subsequently absorbing and/or filtering extracted residue and/or squeezed residue which remains in the extract and/or squeezed liquid by a filter or the like.

The present invention relates to the following (1) to (9).
(1) A method for producing an extract and/or a squeezed liquid, which comprises: feeding a food to be extracted and/or squeezed into a crushing apparatus; adding a solvent into the crushing apparatus immediately after and/or while milling the food; extracting and/or squeezing a useful food component of the food into the solvent; and carrying out liquid-solid separation by removing the resulting extracted residue and/or squeezed residue with a continuous solid-liquid separation apparatus.
(2) The method according to (1), wherein the food to be extracted and/or squeezed is an unpulverized food.
(3) The method according to (1) or (2), wherein the continuous solid-liquid separation apparatus is a decanter.
(4) A method for producing an extract and/or a squeezed liquid, which comprises removing, with a centrifuge, a gustatory inhibiting substance contained in the extract and/or the squeezed liquid obtainable by the method according to any one of (1) to (3).
(5) The method according to (4), wherein the centrifuge is a centrifugal separator for triphasic separation or a basket model vertical centrifuge.
(6) A method for producing an extract and/or a squeezed liquid, which comprises absorbing and/or filtering an extracted residue and/or a squeezed residue of the extract and/or the squeezed liquid obtainable by the method according to any one of (1) to (5).
(7) The method according to (6), wherein said absorbing and/or said filtrating is carried out with a filter.
(8) The method according to any one of (1) to (7), which is carried out at a low temperature under 60° C.
(9) An extract and/or a squeezed liquid with no deterioration of flavor which is obtainable by the method according to any one of (1) to (8).

BRIEF DESCRIPTION OF THE DRAWING

FIG. 1 shows the flow of a series of steps comprising extraction, solid-liquid separation and oil component removal according to the invention.

BEST MODE FOR CARRYING OUT THE INVENTION

The invention will be described below in detail.

The inventors of the present invention previously made extensive and intensive investigations about extraction conditions of roasted coffee beans, and as a result, they found an extraction method by a twin-screw extruder or the like and filed an application for patent with the title of "METHOD OF EXTRACTING AND/OR SQUEEZING EDIBLE FOOD OR DRINK" (JP-A-2003-225054). The details are as follows: roasted coffee beans are milled to a mean particle size of from about 20 to 50 μm, and preferably from 20 to 40 μm, by a twin-screw extruder to increase the surface areas of the milled roasted coffee beans, whereby an extract with high concentration can be quickly carried out even in a low temperature region due to an effective kneading effect by the rotation of the two screws. Also, in a colloid mill such as a masscolloider, when roasted coffee beans are mixed with a solvent at a high speed at the time of milling, it is possible to obtain the same effect as in the case of the twin-screw extruder.

Further, according to the method, when roasted coffee beans with water of about 20° C. by a twin-screw extruder or an analogous apparatus such as a colloid mill, provided is such an advantage that an extraction efficiency of from about 20 to 30% can be obtained in the same manner as in the case in which crushed and roasted coffee beans are extracted with usual hot water.

However, it has become clear that a solid-liquid suspension obtained by feeding a food to be extracted and/or squeezed into a crushing apparatus having a narrow gap, adding a solvent into the crushing apparatus, immediately after and/or while milling the food, and extracting and/or squeezing of a useful food component into the solvent, cannot be subjected to solid-liquid separation efficiently and quickly by the conventional filtering using a flannel or a mesh filter having an opening of several 10 μm.

In the present invention, this solid-liquid suspension is subjected to continuous solid-liquid separation by a continuous solid-liquid separation apparatus, preferably a decanter as a kind of the continuous solid-liquid separation apparatus and an analogous centrifuge. Also, thereafter, the remaining residue and an unnecessary oil component and the like are removed by a centrifuge, preferably a 3-phase separator or a basket model vertical centrifuge which is one kind of centrifuge, if necessary, followed by filtration with a filter to separate particles of about 1 μm. Thus, continuous and quick treatment at room temperature becomes possible, whereby an extract and/or a squeezed liquid free from deterioration in flavor can be obtained. Also, during this, the residue can be dehydrated to such an extent that no liquid droplet is present by compression by manual squeezing or the like. Thus, labor and costs of the disposal can be largely reduced.

In the present invention, examples of food to be extracted and/or squeezed are not particularly limited, so long as it is a food which can be extracted or squeezed, and examples include one or more of coffee, green tea, black tea, oolong tea, puer tea, tekkannon tea, herb tea, wild grass tea, Chinese medical tea, cocoa, vanilla, fruit, and vegetable.

In carrying out the present invention, the food to be treated is treated with a crushing apparatus. The crushing apparatus is preferably a commercially available twin-screw extruder. Furthermore, any machine can be employed so far as it is a continuous kneading crushing apparatus equipped with a twin-screw and the like having an analogous function (for example, a continuous kneader KRC, manufactured by Kurimoto, Ltd.). Accordingly, since a colloid mill such as a masscolloider is a crushing apparatus having a gap which can be adjusted between high speed rotor and a fixed stater treats a food to be treated with a strong shearing force to crush the food, it can be employed in the same manner as the twin-screw extruder or the like in the present invention. The present invention will be described below with reference to the twin-screw extruder as a representative example.

In the invention, the food to be extracted and/or squeezed is treated with a twin-screw extruder. In the treatment, a solvent, especially a low-temperature solvent, is added in the twin-screw extruder is added immediately after and/or while milling the food after the feeding. In this way, when the food to be treated is treated with the extruder or an analogous continuous kneader crushing apparatus, it is milled to have a particle size of from about 1 μm to 5 mm or to have a mean particle size of from 20 to 500 μm including colloid mill, preferably from 20 to 100 μm, more preferably from 20 to 50 μm, a solvent is added thereto, and extruder treatment is carried out. Thus, it is possible to efficiently carry out extraction and/or squeezing within an extremely short time while suppressing the formation of miscellaneous tastes, suppressing the oxidation and keeping the quality of useful components.

The ratio of the solvent to the food to be extracted and/or squeezed is usually from 1/10 to 1/3, and preferably from 1/7 to 1/4 in the case of roasted coffee beans; and from 1/40 to 1/20, and preferably from 1/35 to 1/25, by weight, in the case of green tea. However, the solvent may be added in an amount larger or smaller than the above-mentioned range. With respect to other food to be extracted and/or squeezed, the amount of the solvent to be added is properly determined according to these ratios.

The concentration of soluble solids in a supernatant of the solid-liquid suspension obtained from the twin-screw extruder is adjusted to be from 2 to 10 Brix, and preferably from 3 to 8 Brix in the case of roasted coffee beans; and from 0.5 to 1.5 Brix, and preferably from 0.7 to 1.3 Brix in the case of green tea. However, the concentration may be adjusted higher or lower than the above-mentioned range depending on the use of the extract and/or squeezed liquid. With respect to other foods to be extracted and/or squeezed, the concentration of soluble solids is properly determined according to these ratios.

In the present invention, examples of the solvent which is used for extraction and/or squeezing include water, milk, dairy products, sugar-containing liquids, sugar alcohol-containing liquids, mineral-containing liquids, vitamin-containing liquids, and stabilizer-containing liquids. These solvents may be used singly or in admixture of two or more thereof. The temperature of the solvent to be used in the extruder treatment and subsequent treatments including continuous solid-liquid separation machine treatment, centrifuge treatment and the like, may be in a high temperature region of, for example, about 95° C., but it is preferably in a low temperature region of lower than 60° C., and more preferably 50° C. or lower. The lower limit of the low temperature is not limited, so long as it is a temperature at which the solvent is not frozen. Although it varies with the kind of the solvent, it is usually −5° C. or higher, and preferably −3° C. or higher. Specifically, a low temperature region of from 2 to 30° C. is desirable. When the temperature of the solvent is 60° C. or higher, the generation of causes of deterioration in the flavor including scattering of aroma fragrance components and leakage of bitter taste components such as tannin will be noticed, which results in restriction of the effects of the present invention.

In this way, the solid-liquid suspension obtained by extraction and/or squeezing is separated by a decanter or an analogous centrifuge at from 1,500 to 4,000 G, and preferably from 2,000 to 3,000 G, to obtain an extract and/or a squeezed liquid and an extracted residue and/or a squeeze residue. Thus, it becomes possible to reduce the water content of the residue, which has contained from about 70 to 90% of water before the separation, to about 40% or less, whereby the residue is dehydrated by compression by manual squeezing to such an extent that no liquid droplet is present. Thus, labor and costs of the disposal can be largely reduced.

It is preferable that the solid-liquid suspension obtained by the twin-screw extruder treatment is immediately and continuously subjected to solid-liquid separation by a decanter to suppress oxidation which leads to deterioration in flavor as far as possible.

In the present invention, a continuous solid-liquid separation apparatus is used for the solid-liquid separation of the solid-liquid suspension obtained by extraction and/or squeezing. As the continuous solid-liquid separation apparatus, a centrifugal sedimentation apparatus, a centrifugal filtration apparatus, a continuous filtration apparatus, and the like may be employed, but a decanter is preferably employed from the standpoints of treatment speed, treatment performance, operability, and dehydration rate of the extracted residue and/or squeezed residue. The decanter is also called a decanter type centrifuge or a centrifugal inclination apparatus, and its representative model includes a conveyor or screw discharge type and a skimming type. These commercially available apparatuses can be properly employed. Also, in the present invention, centrifuges analogous to the decanter such as a De-cone type centrifuge (manufactured by Tanabe Willtec Inc.) are included in the decanter, and they can be similarly employed.

By the decanter treatment, it is possible to reduce the content of the extracted residue and/or squeezed residue in the extract and/or squeezed liquid to about 1 to 3% by weight.

For example, it is possible to carry out good solid-liquid separation by using a 660 model decanter manufactured by Tomoe Engineering Co., Ltd. and operating it under conditions of a supply rate of the solid-liquid suspension of from 150 to 250 kg/h, the speed of rotation of bowl of about 6,000 rpm (3,000 G), and a differential motion of raking spiral axis of about 50 rpm.

In the present invention, by further treating the resulting extract and/or squeezed liquid obtained as mentioned above with a centrifuge, preferably a separator for triphasic separation or a basket model vertical centrifuge, it is possible to remove the gastatory inhibiting substances and remaining residue. The separated residue is again returned into the continuous solid-liquid separation apparatus and dehydrated.

By this separation apparatus treatment, it is possible to reduce the contents of the extracted residue and/or squeezed residue and the oil components in the extract and/or squeezed liquid to about 0.05 to 0.2% by weight, respectively. As the example of the gustatory inhibiting substances, in addition to oil components, fine substances which cause scum is included. They can be reduced to be less than 0.05% by weight by the separation apparatus treatment. As the separator for triphasic separation to be used herein, commercially available apparatuses such a De Laval type centrifuge equipped with a liquid supply port, a heavy liquid discharge port, a light liquid discharge port, and a solid discharge port can be properly employed.

For example, when a separator for triphasic separation SA101, manufactured by West Falia Separator, Inc. is used, it is operated under conditions of a supply amount of the extract and/or squeeze liquid of from 150 to 250 kg/h, a rotation speed of separation plate of about 9,000 rpm (4,700 G) and a sludge discharge interval of 2 minutes so as to separate the liquid in an amount of from 5 to 20% of the whole amount of the liquid in terms of liquid amount ratio in the light liquid oil component portion.

Also, as the basket model vertical centrifuge, commercially available machines such as a Sharples type centrifuge equipped with a liquid supply port, a heavy liquid discharge port, and a light liquid discharge port can be properly employed. This centrifuge is operated according to the operation conditions as in the separator for triphasic separation, SA101, manufactured by West Falia Separator, Inc.

The thus obtained extract and/or squeezed liquid is subsequently subjected to adsorption and/or filtration of the extracted residue and/or squeezed residue and scum in the food to be extracted and/or squeezed remaining in the liquid using a filter capable of separating particles having a size of about 1 µm or the like, if necessary. As the filter, a filter having an adsorption function by zeta potential is preferably used in addition to filters having a mesh size which can separate particle as above-mentioned particle. Additionally, a kind of supplemental agents for filtration used for usual foods and drink such as activated carbon and diatomaceous earth can be used together.

In the present invention, the retention time of the solid-liquid suspension within the twin-screw extruder is within the range of from 10 to 30 seconds; the retention time of the extract and/or squeezed liquid within the decanter is within the range of from 30 to 60 seconds; and the retention time of the extract and/or squeezed liquid within the separator for triphasic separation is in the range of from 20 to 40 seconds. Each of the extract, solid-liquid separation and oil component removal steps can be quickly carried out in a short time. Furthermore, these steps are set up in a series of the production line and can be continuously carried out. The retention time required for the whole of treatments of from the start of feeding the food to be extracted and/or squeezed until the completion of obtaining the extract and/or squeezed liquid is short as from 60 to 130 seconds. These retention times may possibly become longer or shorter than the above-mentioned range depending upon differences in the apparatuses to be used, such as a twin-screw extruder, a decanter, and a separator for triphasic separation and the kind and model of apparatuses, and differences in operation conditions thereof.

In this way, it is needless to say that the present invention is workable in a high temperature region as in the conventional technologies. Also, according to the invention, it is possible to carry out extraction and/or squeezing and solid-liquid separation quickly and continuously even under works at 60° C. or lower temperatures including room temperature. Thus, the present invention gives rise to extremely useful effects in improvement in flavor and from the viewpoints of economy and workability, as compared with the conventionally employed extraction and/or squeezing and solid-liquid separation methods including low-temperature extract, high-temperature works and batchwise solid-liquid separation, which likely cause deterioration in flavor due to oxidation after crushing a food to be extracted and/or squeezed and require long periods of time. Also, the present invention has such an advantage that the residue after the solid-liquid separation by a decanter or the like is sufficiently dehydrated, whereby putrefaction in the room temperature region, etc. can be suppressed. Consequently, the present invention is an important invention from the viewpoint of preservation of the environment.

A part of or all of these processes can be carried out under deoxygenated condition in the presence of inert gas such as nitrogen gas.

In addition, according to the present invention, the extract and/or squeezed liquid obtained from the continuous and quick treatments in a series of steps comprising extraction and/or squeezing, solid-liquid separation, and removal of oil components for the food to be extracted and/or squeezed especially in a low temperature region of under 60° C. according to the invention has a quality characteristic with good flavor so that its use value is extremely high. Thus, in the case where the food to be extracted and/or squeezed is not crushed, an extract and/or a squeezed liquid with better flavor can be provided without scattering specific flavor in the food as in coffee.

The thus obtained extract and/or squeezed liquid according to the present invention can be bed into a container directly to prepare a beverage product, when produced by preparing and using a suitable solvent such as a sugar-containing liquid. If desired, materials or components, for example, milk or dairy products; sweeteners such as sugars, sugar alcohols, stevia, and honey; pH adjusters such as sodium bicarbonate; antioxidants such as vitamin C and its sodium salts; gustatory agents such as nucleic acids and amino acids; mineral compounds such as calcium and magnesium; vitamins such as vitamin A, vitamin B, vitamin C, vitamin D, and vitamin E; stabilizers such as pectin and carboxymethyl cellulose; emulsifiers such as glycerin fatty acid esters; bacteriostatic agents such as sucrose fatty acid esters; flavors; and dyes may be added to form products. Also, the extract and/or squeezed liquid may be used as a raw material for a variety of products without being provided as a final product.

The present invention will be described below with reference to the following Example, but it should not be construed that the present invention is limited thereto. Hereinafter, unless otherwise indicated, % means % by weight.

EXAMPLE 1

Using KEX-50 (manufactured by Kurimoto, Ltd.) as a twin-screw extruder, a 12 mm-pitch paddle screw was installed in each of second, third and fourth barrel sections, and a 16 mm-pitch reverse screw was installed immediately below the downstream section of the paddle screw of each of the third and fourth barrel sections, thereby enhancing kneading ability. Also, the speed of rotation of the screw was set up at 220 rpm, and the barrel temperature was set up at 20° C.

Coffee beans produced in Colombia, which had been roasted so as to have an L value of 21 and was not crushed, were used as coffee beans and bed into a first barrel section of the twin-screw extruder at a rate of 28.6 kg/h using a vibration feeder. The roasted beans were forcedly sent into a narrow gap and crushed by rotation of the screw.

Thereafter, water at 20° C. was added at a rate of 171.4 kg/h from the second barrel section, thereby subjecting the crushed roasted coffee beans to shearing, kneading and emulsification. The roasted coffee beans were milled to have a mean particle size of from 30 to 40 μm within the extruder and then provided for extraction. A solid-liquid suspension was extruded from a die outlet for about 20 seconds and reached stationary state within about 3 minutes. The resulting solid-liquid suspension was centrifuged at 750 G for 10 minutes. The amount of a supernatant and the amount of a precipitate were measured, and the soluble solids content of the supernatant was measured by a saccharimeter.

The solid-liquid suspension from the extruder outlet was supplied into a 660 Model decanter manufactured by Tomoe Engineering Co., Ltd. and treated at the speed of rotation of bowl of about 6,000 rpm (3,000 G), the speed of rotation of a pinion axis of 1,250 rpm and a differential motion of raking spiral axis of about 50 rpm. About thirty seconds to one minute after supplying the suspension into the decanter, separation occurred, and reached a stationary state within about 3 minutes. The resulting extract was centrifuged at 750 G for 10 minutes. The amount of a supernatant and the amount of a precipitate were measured, and the soluble solids content of the supernatant was measured by a saccharimeter. Also, the water content of the extracted residue discharged from the decanter was measured.

The resulting extract was supplied into a separator for triphasic separation, SA101 (manufactured by West Falia Separator, Inc.), and the separator was operated at the speed of rotation of 9,000 rpm while discharging a sludge at an interval of 2 minutes, and adjusted the speed so as to separate the liquid in an amount of from 5 to 20% of the whole amount of the extracted liquid in terms of liquid amount ratio in the light liquid oil component portion. About thirty seconds after supplying the extract into the separator, separation occurred, and became stationary state within about one minute. The resulting extract was centrifuged at 750 G for 10 minutes. The amount of a supernatant and the amount of a precipitate were measured, and the soluble solids content of the supernatant was measured by a saccharimeter. Also, the residue discharged from the separator was returned into a balance tank before the decanter and again dehydrated in the decanter.

As control methods, a method in which 20 kg of the solid-liquid suspension from the extruder outlet was filtered by a flannel filter; and a method in which 17.1 kg of hot water at 90° C. was added to 2.9 kg of roasted coffee beans having a mean particle size of about 400 μm immediately after crushing in a granulator, and after retaining for 10 minutes, followed by filtration by a flannel filter.

The flow of Example 1 is shown in FIG. 1. The roasted coffee beans are bed into the first barrel section of the KEX-50 extruder by the vibration feeder, and the water is added in the second barrel section. The solid-liquid suspension from the extruder outlet is continuously supplied into the 660 Model decanter while storing a small amount of the suspension in the balance tank, separated into the extracted liquid and the residue, and each of them are then taken out. The discharged residue is disposed.

The extract from the decanter outlet is subsequently supplied into the separator for triphasic separation SA101 by means of a pump, treated and separated into the extracted liquid, the oil component, and the residue. The extract of the present invention is obtained. The residue is returned into the balance tank before the 660 Model decanter.

Each of the solid-liquid suspensions (at the extruder outlet), the extracted liquids (at the decanter outlet and separator outlet) and the filtrates after filtration by a flannel filter of Example 1 (method of the present invention) and the control methods was measured at the centrifugation rate (%) of 750 G for 10 minutes, that is, content of extract residue (%), and the soluble solid content of supernatant (Brix), and the water content of each of the residue discharged from the decanter and the residue after filtration by flannel filter. The results are shown in Table 1. The part which is not necessary to be measured is represented as "-".

TABLE 1

| | Method of the present invention [(extruder extraction) + (continuous solid-liquid separation)] | | | | Control method [(extruder extraction) + (batchwise solid-liquid separation)] | | | | Control method [(batchwise extraction) + (batchwise solid-liquid separation)] | | | |
|---|---|---|---|---|---|---|---|---|---|---|---|---|
| | Centrifugation rate at 750 G for 10 minutes [%] | Brix | Water Content [%] | | Centrifugation rate at 750 G for 10 minutes [%] | Brix | Water content [%] | | Centrifugation rate at 750 G for 10 minutes [%] | Brix | Water content [%] |
| At extruder outlet | 37.5 | 5.0 | — | At extruder outlet | 37.5 | 5.0 | — | — | — | — | — |
| At decanter outlet | 2.0 | 5.2 | — | Filtrate after filtration by flannel filter | 2.0 | 0.5 | — | Filtrate after filtration by flannel filter | 0.5 | 5.1 | — |
| At separator outlet | 0.1 | 5.2 | — | — | — | — | — | — | — | — | — |
| Decanter residue | — | — | 40.0 | Residue after filtration by flannel filter | 0.1 | — | 70.0 | Residue after filtration by flannel filter | — | — | 55.0 |

According to the method of Example 1 (method of the present invention), the roasted coffee beans were continuously treated in the room temperature region of 20° C., and about 5 minutes after the treatment, the extract having a soluble solid content of 5.2 Brix of the present invention could be stationarily obtained from the separator outlet. Also, the retention time of the treated liquid within a series of steps from the extruder inlet until the separator outlet was about 1 minute 30 seconds. Thus, according to the method of Example 1, since a series of steps comprising crushing of the roasted coffee beans, extraction, solid-liquid separation, and oil component removal are carried out continuously but not batchwise, the working efficiency is good, and oxidation which relates to deterioration in flavor can be suppressed as far as possible by the treatment in a short time. Also, the water content of the extracted residue is reduced to about 40% by the decanter treatment, and the extracted residue is dehydrated by compression by manual squeeze or the like to such an extent that no liquid droplet is present. Thus, labor and costs of the disposal can be largely reduced.

Whereas, according to the control method in which after extruder extraction, filtration by a flannel filter is carried out, even after carrying out the solid-liquid separation treatment for 3 hours, it was impossible to completely terminate dropping of water. At that time, the water content was so high as 70%.

Also, similarly, according to the control method, in the case where the roasted coffee beans were coarsely crushed at dial 5 and filtered by a flannel filter, dropping was substantially terminated within about one hour, and the dehydration effect as in the decanter separation was not obtained.

The extracted liquid from the decanter outlet according to the method of Example 1 was free from deterioration in flavor, sufficiently kept the aroma fragrant components and was good in flavor. Also, the fat content of the extract was about 0.1% corresponding to the control product because the oil component was separated by the separator. Thus, also at this point, good flavor could be obtained.

According to the control method in which after extruder extraction, filtration by a flannel filter was carried out, it took a long period of time, 3 hours or more to complete the solid-liquid separation. However, since this operation was carried out at 20° C., the deterioration in flavor due to oxidation during the solid-liquid separation was little.

Also, similarly, according to the control method, in the case where the roasted coffee beans were coarsely crushed without using an extruder and filtered by a flannel filter, in order to retain the extract efficiency, it was compelled to carry out the extraction at high temperatures for a long time, thereby obtaining an extract having a concentration of soluble solids content of 5.1 Brix. However, oxidation of the extracted liquid and scattering of aroma fragrance components occurred during the extract and the solid-liquid separation treatment, so that the resulting extracted liquid was poor in quality.

EXAMPLE 2

In the same manner as in Example 1, green tea (green tea of middle grade, produced in Shizuoka prefecture, Japan) was bed in to an extruder at rate of 5.88 kg/h. Deionized water at 20° C. was added at a rate of 194.12 kg/h and tea was sheared, followed by kneading and emulsification. In the extruder, tea was milled to have a mean particle about from 30 to 40 µm, and provided for extraction. The thus obtained solid-liquid suspension was charged in a decanter and treated, followed by charging in the separator for triphasic separation to separate the residue and scum. An extract from the separator outlet was continuously subjected to filter treatment by using a liquid filter back 525 (Sumitomo 3M). The thus obtained tea extraction liquid had good flavor and fresh green tea fragrance, and bitter taste was suppressed. Therefore, the liquid had clean taste with rich flavor. Additionally, the water content in the residue extracted from a decanter was 30%. Conditions were the same as in Example 1, except for closing the outlet on the light liquid side to prevent separation of the light liquid phase from the triphases.

INDUSTRIAL APPLICABILITY

The present invention improves the efficient extraction and/or squeezing procedure of obtaining soluble solids from foods to be generally extracted and/or squeezed, such as coffee, green tea, herb tea, Chinese medical tea, fruits, and vegetables, followed by a solid-liquid procedure into a continuous, quick and novel model which can be conducted at room temperature, while avoiding conventional procedures concepts such as batch mode at high temperature. As a result, the present invention is useful for suppressing causes of deterioration in flavor such as oxidation of the extract and/or squeezed liquid and scattering of aromas, as far as possible. Moreover, it is designed to largely enhance the conventional dehydration effect of the residue in the extraction and/or squeezing procedure, thereby improving the result. Also, it is designed to reduce the treatment and disposal cost of the residue. Thus, the present invention acts to alleviate the environmental problems and is a socially attractive and important treatment system.

The invention claimed is:

1. A method for producing an extract of coffee beans comprising
feeding roasted coffee beans into a twin-screw extruder from an inlet thereof, milling the coffee beans;
adding a solvent immediately after milling the coffee beans, followed by kneading said milled coffee beans to simultaneously extract an useful food component of the coffee beans into the solvent; and
subsequently carrying out continuous solid-liquid separation of a solid-liquid suspension extruded from an outlet of the twin-screw extruder with a continuous liquid-solid separation apparatus, thereby removing the resulting extracted residue to obtain the extract, wherein the operations from the kneading of the milled coffee beans within the twin-screw extruder to the liquid-solid separation with the continuous liquid-solid separation apparatus are carried out within a low temperature region with a solvent temperature of 2 to 30° C.

2. The method according to claim 1, wherein the milling of the coffee beans is carried out such that the milled coffee beans has a mean particle size of 20 to 40 µm.

3. The method according to claim 1, wherein the continuous solid-liquid separation apparatus is a decanter.

4. The method according to claim 1, further comprising removing, with a centrifuge, a gustatory inhibiting substance contained in the extract.

5. The method according to claim 4, wherein the centrifuge is a centrifugal separator for triphasic separation or a basket model vertical centrifuge.

6. The method according to claim 1, further comprising absorbing and/or filtering the extracted residue remained in the extract from the extract.

7. An extract with no deterioration of flavor, which is obtained by the method according to claim 1.

* * * * *